(12) United States Patent
Watanabe

(10) Patent No.: US 6,452,898 B1
(45) Date of Patent: Sep. 17, 2002

(54) CONSTANT LINEAR VELOCITY (CLV) OPTICAL DISC

(75) Inventor: Hisao Watanabe, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/429,605

(22) Filed: Oct. 29, 1999

(30) Foreign Application Priority Data

Oct. 29, 1998 (JP) .......................................... 10-325895

(51) Int. Cl.⁷ ................................................. G11B 7/24
(52) U.S. Cl. ............................... 369/275.3; 369/275.1; 369/44.26
(58) Field of Search ..................... 369/275.3, 275.2, 369/275.1, 53.29, 277, 44.26, 122, 44.32, 44.42, 59.26, 121, 30.23, 124.01, 44.28, 116, 126, 13.54, 47.4, 44.13, 47.48, 47.19, 59.25, 275.4

(56) References Cited

U.S. PATENT DOCUMENTS 5,345,435 A * 9/1994 Yamasaki ................. 369/275.3
5,751,689 A * 5/1998 Hoshino et al. .......... 369/275.1
5,844,883 A * 12/1998 Kanno et al. ............ 369/53.29
6,028,828 A * 2/2000 Maeda ....................... 369/47.4
6,201,784 B1 * 3/2001 Maeda ..................... 369/59.25

FOREIGN PATENT DOCUMENTS

JP 08-279129 * 10/1996
JP 09-016980 * 1/1997

* cited by examiner

Primary Examiner—Ali Neyzari
(74) Attorney, Agent, or Firm—Oblon, Spivak, McClelland, Maier & Neustadt, P.C.

(57) ABSTRACT

A CLV (Constant Linear Velocity) optical disc which can record the information with a constant linear velocity, wherein plural lines of specified tracks exist in a predetermined data area, a railroad length of the specified tracks is integer multiple of the length of a sector, the length of the sector on the specified tracks is $2 \times \pi \times N$ times a track pitch, the number N being a positive integral number, and head positions of the specified tracks are lined up on a predetermined radius line A–A' at equal track intervals. The tracks including a head sector on the predetermined data area are the specified tracks. In such structure, calculation of the conversion between the information number and the number of the tracks can be simple, the unevenness of the disc format manufactured by use of different optical disc master board (plate) can be eliminated, and high-speed accessing operations can be performed.

6 Claims, 4 Drawing Sheets

CONSTANT LINEAR VELOCITY (CLV) OPTICAL DISC

CROSS-REFERENCE TO RELATED APPLICATIONS

This application claims priority under 35 USC §120 to Japanese Patent Application No. 10-325895, filed in the Japanese Patent Office on Oct. 29, 1998, and the entire contents of which are hereby incorporated by reference.

BACKGROUND OF THE INVENTION

1. Field of the Invention

The present invention relates to a constant linear velocity (CLV) optical disc, and in particular, a format of the above-mentioned CLV optical disc.

2. Discussion of the Background

In order to raise the speed of accessing information recorded on an optical disc, it is necessary to control the speed of moving the optical head precisely and with high speed. When an optical disc apparatus receives from a higher-level apparatus a command to access the information, the optical disc apparatus calculates the relationship between the logical number of the information and the physical position as shown by the track number or the sector number on the optical disc, and the apparatus moves the optical head to the above-mentioned physical position.

Presently, recording on optical discs is performed according to a CAV (Constant Angular Velocity) type recording method in which the angular velocity is constant or a CLV (Constant Linear Velocity) type recording method in which the linear velocity is constant.

In the CAV method, since the amount of the information on one track is always constant regardless of recording on inner or outer circumferences of the disc, the conversion between the logical information number and the track number (numerical value) can easily be calculated, in a very short time. However, according to the CAV method, there arises a problem that the line density of the information at the outer circumference of the disc is lowered and thereby the overall memory capacity is lowered. In order to avoid lowered memory capacity, a modified CAV method has been devised wherein that the frequency of the recording signal is raised at the outer circumferential portion of the disc for the purpose of making uniform the line density on the respective inner and outer circumferential portions. However, in the modified CAV method, there arises another problem that the structure of a formatter circuit becomes complicated.

From the viewpoint of memory capacity and simplification of the formatter circuit, the CLV method is preferable over the CAV method. However, in the CLV method, the amount of the information on one track differs in accordance with the radius position on the disc, and calculating the conversion between the information number and the physical position may become further complicated. As the result, the conversion calculation cannot be done in a short time, and as a result, the access time may be increased.

In the recent years, as large-capacity optical disc media, DVD-ROM, DVD-R, and DVD-RAM, etc. have become noteworthy. Further increase s in memory capacity is continuously desired even now. Namely, it can be expected that pitch is to be narrowed more and more and thereby the size of a bit is further decreased. In such a situation, high-speed access to such a large-capacity media has become important.

Japanese Laid-Open Patent Publication No. 9-16980 entitled, "A METHOD OF ACCESSING INFORMATION ON AN CLV OPTICAL DISC" describes a method including the steps of: firstly determining only the moving direction of the optical head; driving, in advance, the optical head moving medium; obtaining, thereafter, the present position (track number) corresponding to the present address and the target position (track number) corresponding to the access target address by the calculation; calculating the number of tracks between the present position and the target position; and finally performing the access control.

However, there is a limitation in the realization of high-speed operation obtained in such way as mentioned heretofore. Therefore, the sufficient high-speed access cannot always be realized.

On the other hand, Japanese Laid-upon Patent Publication No. 8-279129 entitled, "A METHOD OF MANUFACTURING A CLV DISC" although not directed to a method of controlling the CLV, instead describes a method of arranging the sector without causing any angular positional error obtained at the time of ideally driving the CL+V. The disclosed method includes the steps of: causing the formatter to receive the start position of the start sector's address from a cutting machine with the same angular information; previously estimating the address situated at the same neighboring angular position as that of the start address; changing the buffer length when the sector arrives at the above-mentioned estimated address; confirming thereby the arrival of the electric signal of the angular information sent from the cutting machine; sending the address signal of the next sector and thereby absorbing the variation of the angular position due to the error of the cutting start radius position and due to the change of the track pitch; and making uniform the sector angle between the different stampers.

However, according to the method as mentioned above, it is inevitably necessary to perform special processings such as the estimation of the sector arriving at the same neighboring angular position as that of the start sector and the compensation of the buffer length, etc.

As mentioned above, the conventional CLV optical disc requires much time for calculating the conversion between the logical information number and the physical position. Therefore, the speed of accessing the disc information is inevitably lowered.

SUMMARY OF THE INVENTION

Accordingly, an object of the present invention is to provide an improved CLV optical disc and the CLV type method of disc-formatting whereby calculation of the conversion between the logical information number and the physical position does not require much time and the speed of accessing the disc information is increased.

In consideration of the above, therefore, a further object of the present invention is to realize the CLV optical disc capable of facilitating the calculation of the conversion between the information number and the track number, eliminating the unevenness of the format of the disc manufactured by use of the different optical disc master 7 board (plate), and accessing the disc information with high speed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings; wherein.

DETAILED DESCRIPTION OF THE PREFERRED EMBODIMENTS

Figure 1:
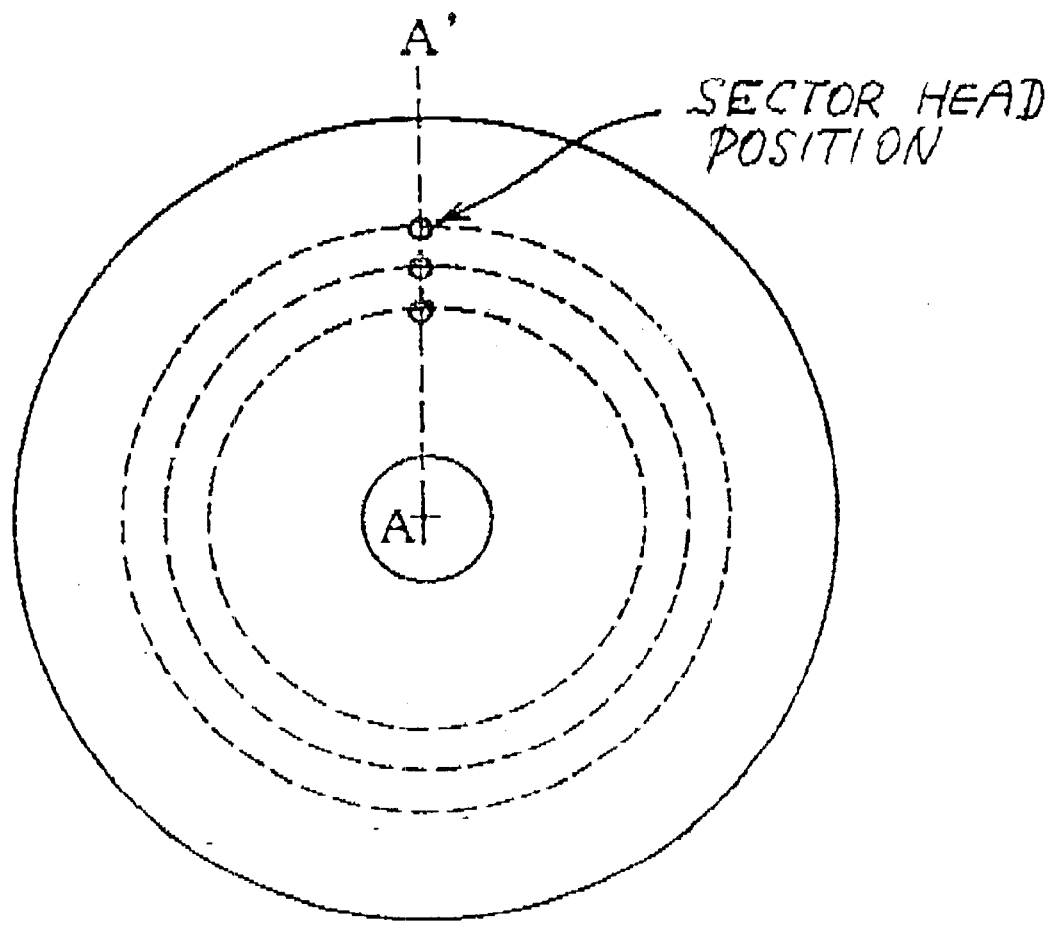
FIG. 1 is a schematic illustration of a format of a CLV (Constant Linear Velocity) optical disc according to the present invention.

In describing the preferred embodiments of the present invention illustrated in the drawings, specific terminology is employed for the sake of clarity. However, the invention is not intended to be limited to the specific terminology so selected and it is to be understood that each specific element includes all technical equivalents which operate in a similar manner.

Figure 2:
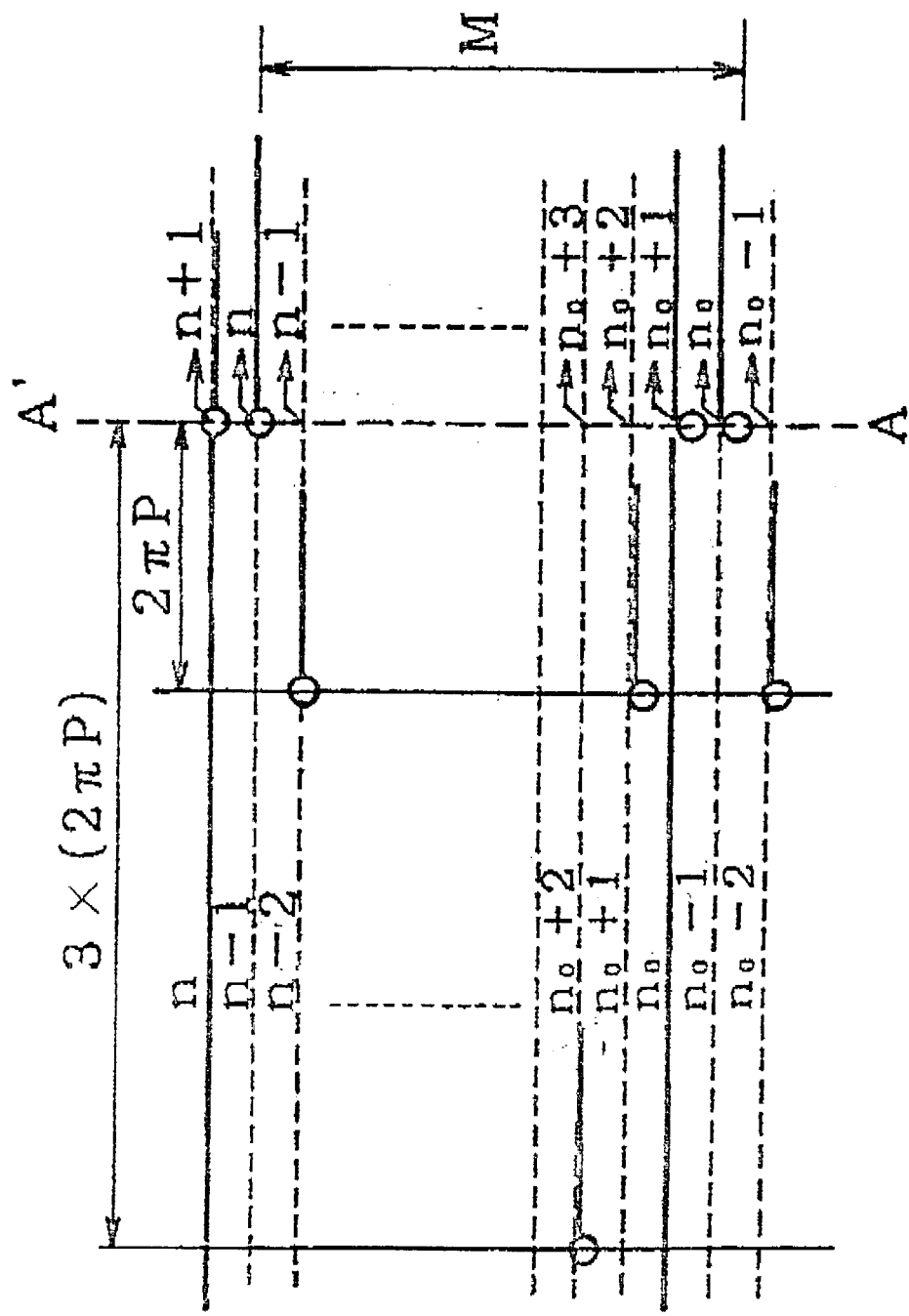
FIG. 2 is a schematic illustration of a sector arrangement of the CLV optical disc according to the present invention.
Figure 3:
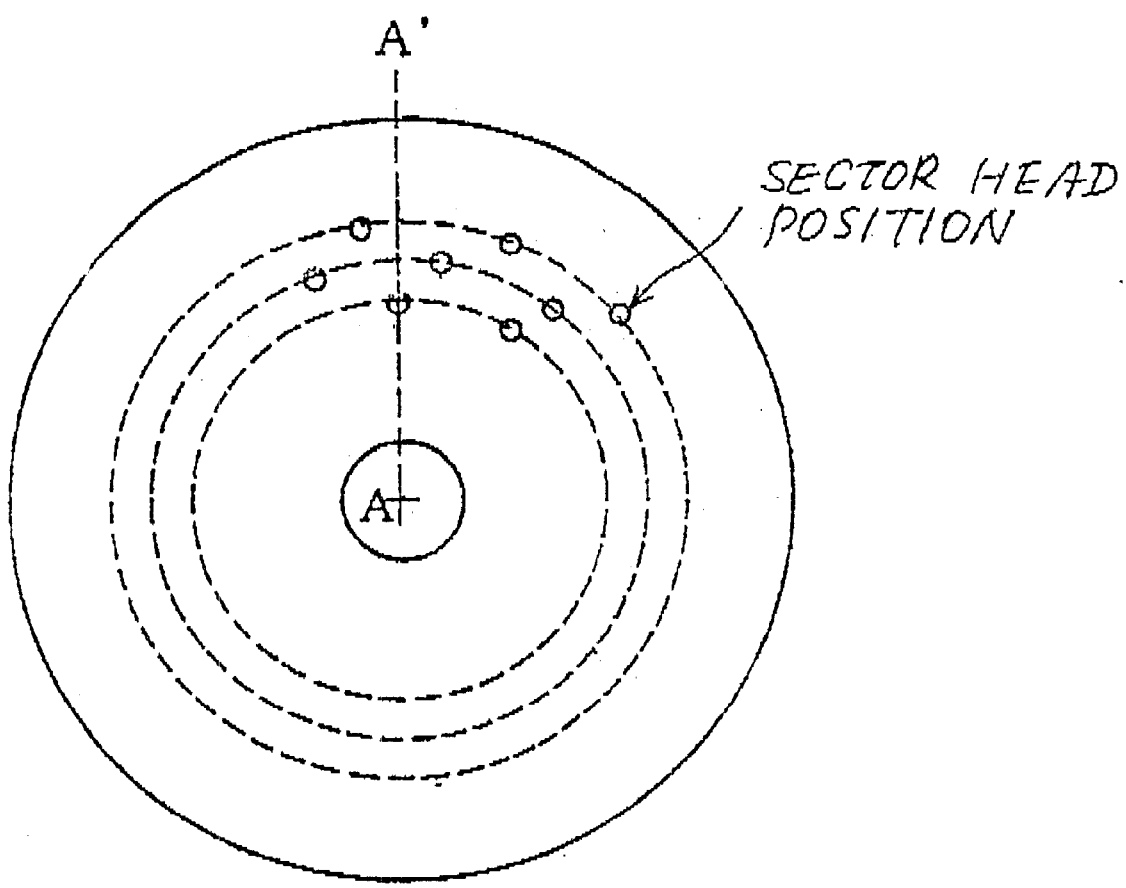
FIG. 3 is a schematic illustration of a format of a conventional CLV optical disc.

Referring now to the drawings, wherein like reference numerals designate identical or corresponding parts throughout the several illustrations, and more particularly to FIGS. 1 and 2 thereof, there are illustrated a format of a CLV (Constant Linear Velocity) optical disc according to the present invention and a sector arrangement of the CLV optical disc of the invention.

As described in more detail below, a first aspect of the invention is featured in that a CLV optical disc records information with a constant linear velocity, plural lines of specified tracks exist in the predetermined data area, a railroad length of the specified tracks is an integer multiple of the length of a sector, the length of the sector on the specified tracks is $2 \times \pi \times N$ times a track pitch, the number N being a positive integral number, and head positions of the specified tracks are lined up on a predetermined radius line at equal track intervals.

As also described in more detail below, a second aspect of the invention is featured in that, in the CLV optical disc of the present invention, the tracks including a head sector on the predetermined data area are the specified tracks.

The CLV optical disc according to the present invention is next described in detail.

In a spiral track of equal pitch formed by the CLV driving, the railroad track length L of the entire track thereof is expressed by a below equation (1).

$$L = \pi \times (r^2 - Ro^2)/P \quad (1)$$

$$V = Ro + n \times p(n=1,2,3,\ldots) \quad (2)$$

Figure 4:
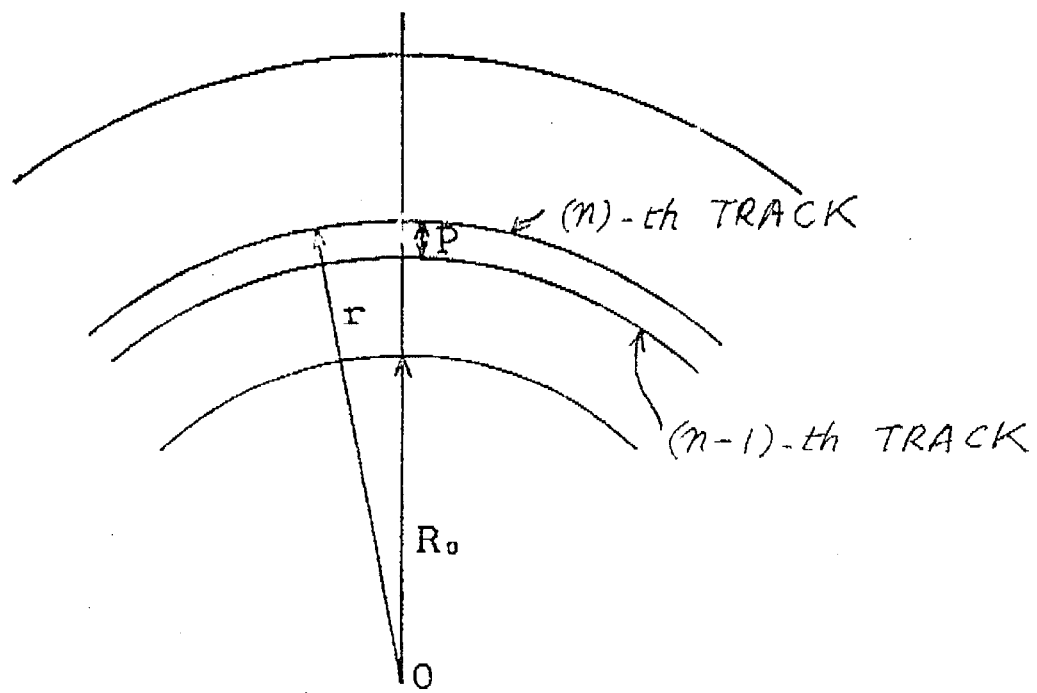
FIG. 4 is a schematic illustration of the meaning of a constant.

Here, as shown in FIG. 4, the symbol Ro represents the radius position of starting the spiral, r represents the radius position of the spiral in regard to measurement of the railroad track length L, P represents the spiral track pitch, and n represents the number of the tracks.

The following equation (3) can be obtained from the above equations (1) and (2):

$$L = 2 \times \pi \times Ro \times n + n^2 \times \pi \times P(n=1,2,3,\ldots) \quad (3)$$

$$LN = 2 \times \pi \times Ro + (2 \times n - 1) \times P(n=1,2,3\ldots) \quad (4)$$

From equation (4), it is apparent that the railroad track length difference between the adjacent tracks is constant as shown below:

Railroad Track Length Difference between the Adjacent Track B $$= 2 \times \pi \times P = \text{constant} \quad (5)$$

Here, assuming that a sector head position on a track is taken as a standard position, and the increasing railroad track length (sumdLm) is obtained at the position preceding by m tracks, the relationship between the increasing railroad track length and the other constants is expressed by the following equation (6):

$$sumdLm = 2 \times \pi \times P(1 + 2 + 3 + \ldots + m) \quad (6)$$

$$= \pi \times P(m+1)$$

Next, an outline of the CLV optical disc format relating to the first aspect of the present invention illustrated in FIG. 1 is described.

Assuming that the head positions of the sector are arranged at equal track intervals on a radius line A–A'. Sectors of integer number No are contained on the information area or the inner circumferential track no thereof and the sector length is integer (Ns) times of $2 \times \pi \times P$, the relationship between Lno, Ro, no, P, Ns, No, and the sector length can be expressed by the following equations (7) and (8):

$$Lno = 2 \times \pi \times Ro + (2 \times no - 1) \times \pi \times P \quad (7)$$

$$= 2 \times \pi \times P \times Ns \times No$$

$$2 \times \pi \times P \times Ns = \text{Sector Length} \quad (8)$$

Here, Ns and No are both integers. Assuming that, in the track (n−1), since the track length difference from the track no to the track (n−1) is an integer multiple of the sector length, the relationship between the constants can be expressed by the following equation (9) as can be obtained from the equation (6):

$$(n-1-no) \times (n-no) = 2 \times Ns \times Nx \quad (9),$$

wherein, Ns and Nx are both integers, and furthermore, in the track n, the relationship therebetween can be expressed by the following equation (10):

$$Ln = 2 \times \pi \times Ro + (2 \times n - 1) \times \pi \times P \quad (10)$$

$$= 2 \times \pi \times P \times Ns \times No'$$

wherein Ns and No' are both integers, the head positions of the sector are arranged on the same radius line A–A' as shown in FIG. 2.

The above relationship is proved hereinafter, by the following descriptions and equations. From equation (7), the following equation can be obtained;

$$2 \times \pi \times Ro = 2 \times \pi \times P \times Ns \times No - 2 \times \pi P \times no + \pi \times P \quad (11)$$

Substituting equation (11) for equation (10), the following equation (12) can be obtained:

$$n - no = Ns \times (No' - No) \quad (12)$$

Here, assuming that n−no is an integer m (n−no=M), it may be allowable that there exist the integers; M, Nx, No', and No satisfying the following two equations (13) and (14):

$$M \times (M-1) = 2 \times Ns \times Nx \quad (13)$$

$$M = Ns \times (No' - No) \quad (14)$$

In equation (13), the situation is considered to be divided into two cases, i.e., Ns is an odd number, and Ns is an even number.

When Ns is an odd number, assuming that M is equal to Ns, namely, $$M = Ns \tag{15}$$

the following equation (16) can be obtained by substituting the above equation (15) for the former equation (13):

$$Ns \times (Ns-1) = Ns \times (2 \times Nx) \tag{16}$$

and the number Nx satisfying the equation (13) can be expressed by the following equation (17) from the above equation (16):

$$Nx = (Ns-1)/2 = (Odd\ Number)/2 \tag{17}$$
$$= Integral\ Number\ (Integer)$$

Thereby, the number Nx exists.

Furthermore, at this time, the number Nx also satisfies the equation (14), and thereby the following equation can be obtained:

$$(No'-No) = 1 \tag{18}$$

Consequently, when Ns is an odd number, namely, the sector length is an odd-number multiple of $2 \times \pi \times P$, the number Nx is arranged (lined up), at least, per M=Ns tracks. Furthermore, the number of the sectors contained in the track is incremented by "1" successively.

On the other hand, when Ns is an even number, assuming that M is equal to 2×Ns, namely, $$M = 2 \times Ns \tag{19},$$

the following equation (20) can be obtained by substituting the above equation (19) for the former equation (13):

$$2 \times Ns \times (2 \times Ns - 1) = 2 \times Ns \times Nx \tag{20}$$

and the number Nx can be expressed by the following equation (21) from the above equation (19):

$$Nx = 2 \times Ns - 1 \tag{21}$$
$$= Integral\ Number\ (Integer)$$

Thereby, the number Nx exists.

Furthermore, at this time, the number Nx also satisfies the equation (14), and thereby the following equation can be obtained:

$$(No'-No) = 2$$

Consequently, when Ns is an even number, namely, the sector length is an even-number multiple of $2 \times X \times P$, the number Nx is arranged (lined up), at least, per M=2×Ns tracks. Furthermore, the number of the sectors contained in the track is incremented by "2" successively. In such way, the format of the CLV optical disc of the present invention can be realized.

Next, the outline of the CLV optical disc format relating to the second aspect of the present invention is described.

According to the second aspect of the present invention, the format of the CLV optical disc includes the track having a head sector as the designated sector. As to such track, the radius positions (Ro, no) of the track including the head sector as mentioned above, or the sector lengths thereof (P, Ns) is designed so as to satisfy the above-mentioned equations (7) and (8). In such way, the format of the CLV optical disc of the second-aspect embodiment can be realized.

As is apparent from the foregoing description, the present invention can demonstrate advantageous functional effects.

More particularly, in the CLV optical disc capable of recording the information utilizing the CLV (Constant Linear Velocity) method according to the first aspect of the present invention, there exist plural lines of specified tracks having a railroad line track length which is integer multiple of the sector length in the predetermined data area, the sector length of the specified track is a $2 \times \pi \times N$ (N is positive integer) multiple of the track pitch, and the head positions of the specified tracks are lined up at equal track distances (intervals) on the predetermined radius line.

In such a structure, even though the CLV disc format is a complete one, since the head portions of the sector are lined up at equal track distances on the radius line and the number of the sectors contained in the tracks increases successively by a constant number with a constant period (frequency), it is possible to realize the CLV optical disc capable of easily calculating the conversion between the information number and the tracks number, and accessing the information with high speed without decreasing data capacity.

In the CLV optical disc utilizing the CLV method according to the second aspect of the present invention, the track including the head sector in the predetermined data area is the specified track.

In such structure as mentioned above, even though the embodiment includes the complete CLV disc format, since the sector head portions are lined up at the equal track distances on the radius line, and the number of the sectors contained in the track including the head sector successively increases by the constant number with the constant track period (frequency), it is possible to manufacture the CLV disc format such that the unevenness thereof is eliminated between the optical disc media, and it is further possible to specify the target track by the calculating the conversion between the same information number and tracks number. Consequently, the CLV optical disc is capable of high speed accessing of the information.

Numerous modifications and variations of the present invention are possible in light of the above teachings. It is therefore to be understood that within the scope of the appended claims, the present invention may be practiced otherwise than specifically described herein.

What is claimed as new and desired to be secured by Letters Patent of the United States is:

1. A constant linear velocity (CLV) optical disc capable of recording the information with a constant linear velocity, comprising:

plural lines of specified tracks existing in a predetermined data area, said specified tracks having a railroad length which is an integer multiple of the length of a sector;

the length of said sector on said specified tracks being $2 \times \pi \times N$ times a track pitch, the number N being a positive integer; and said specified tracks having head positions which are lined up on a predetermined radius line at equal track intervals.

2. The CLV optical disc of claim 1, wherein the specified tracks are tracks including a head sector on said predetermined data area.

3. A method of assembling a constant linear velocity (CLV) optical disc capable of recording the information with a constant linear velocity, comprising the steps of:

providing plural lines of specified tracks in a predetermined data area, the specified tracks having a railroad length which is an integer multiple of the length of a sector;

making the length of said sector on said specified tracks equal to 2×π×N times a track pitch, the number N being a positive integer; and lining up the head positions of said specified tracks on a predetermined radius line at equal track intervals.

4. The method of claim 3, comprising:

assigning tracks including a head sector on said predetermined data area as said specified tracks.

5. A constant linear velocity (CLV) optical disc capable of recording the information with a constant linear velocity, comprising:

plural lines of specified tracks existing in a predetermined data area; and a sector having a length of 2×π×N times of a track pitch on said specified tracks, the number N being a positive integer;

wherein a railroad length of said specified tracks is integer multiple the length of said sector; and wherein said specified tracks have head positions which are linked up on a predetermined radius line at equal track intervals.

6. The CLV optical disc of in claim 5, wherein the specified tracks are tracks including a head sector on said predetermined data area.

* * * * *